United States Patent [19]

Kovatch et al.

[11] 4,295,054
[45] Oct. 13, 1981

[54] ELECTRIC CONTROL SYSTEM WITH ROTARY MECHANICAL INTERLOCK AND TIMING MECHANISM

[75] Inventors: George N. Kovatch, Monroeville; George S. Bettencourt, Murrysville; Otto H. Soles, North Huntingdon, all of Pa.

[73] Assignee: Westinghouse Electric Corp., Pittsburgh, Pa.

[21] Appl. No.: 87,366

[22] Filed: Oct. 23, 1979

[51] Int. Cl.³ .............................................. H02J 9/00
[52] U.S. Cl. .................................. 307/80; 200/50 C
[58] Field of Search ...................... 200/50 C, DIG. 6; 307/64, 65, 23, 66, 67, 68, 80; 361/343

[56] References Cited

U.S. PATENT DOCUMENTS

| Re. 26,113 | 11/1966 | Carter et al. | 200/50 C |
| 3,710,288 | 1/1973 | Grunert | 335/160 |
| 3,736,538 | 5/1973 | Owen | 335/160 |
| 3,778,633 | 12/1973 | DeVisser | 200/50 C X |
| 4,114,005 | 9/1978 | Maier et al. | 200/153 G |

Primary Examiner—J. V. Truhe
Attorney, Agent, or Firm—L. P. Johns

[57] ABSTRACT

An electric control system with mechanical interlock characterized by means for switching between one or another supply line extending to a load which comprises two parallel paths extending to the load which path includes spaced controlled devices, and rotary mechanical interlock timing means between the several control devices for sequentially preventing closing of two or more control devices at the same time.

6 Claims, 12 Drawing Figures

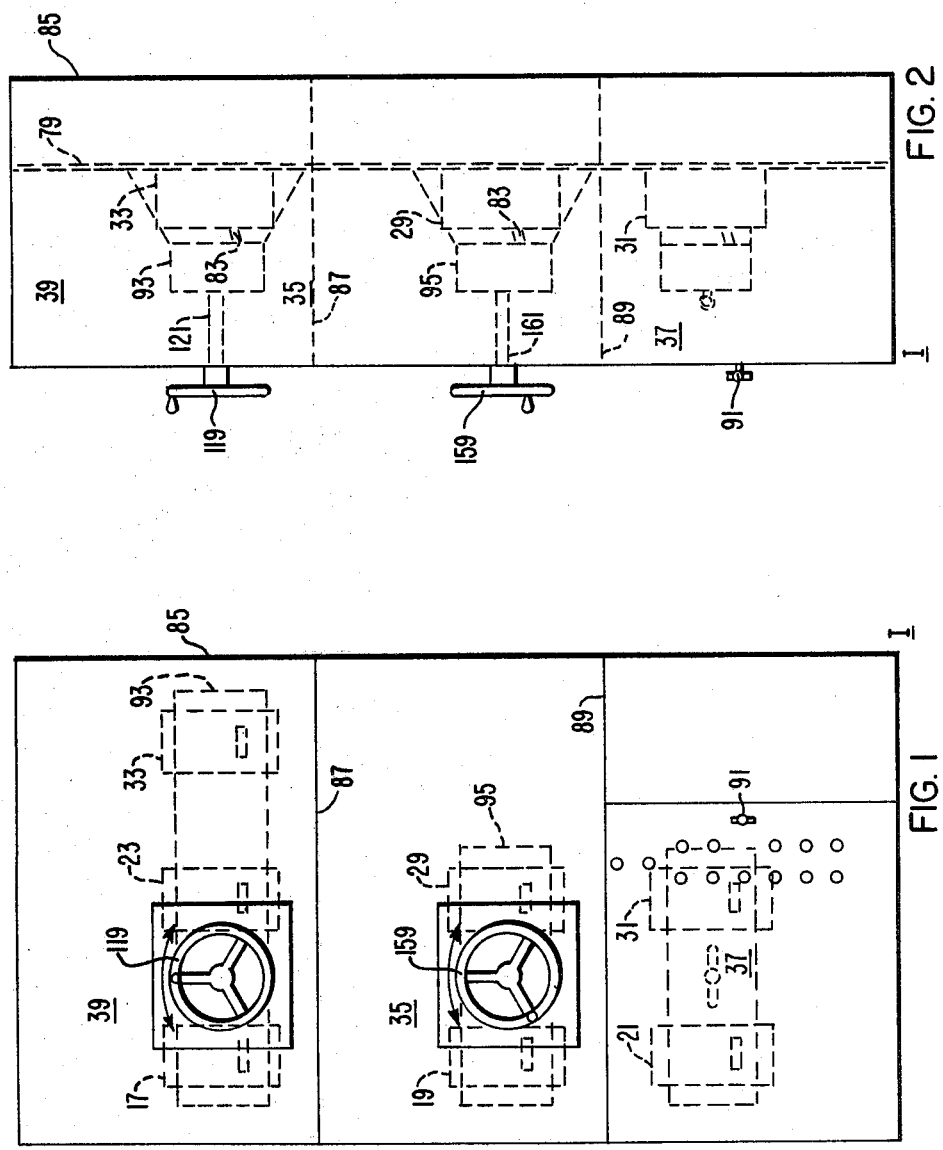

ELECTRIC CONTROL SYSTEM WITH ROTARY MECHANICAL INTERLOCK AND TIMING MECHANISM

CROSS-REFERENCE TO RELATED APPLICATION

This application is related to copending application Ser. No. 087,365, filed Oct. 23, 1979, to George N. Kovatch and James B. Wallace.

BACKGROUND OF THE INVENTION

1. Field of the Invention

This invention relates to an electric control system with a sequentially movable camming means for preventing closing of two or more circuit breakers at the same time.

2. Description of the Prior Art

In the past, a transfer switch was required to transfer power from an existing power source to an alternate emergency power source. Such a switch has become an absolute necessity in hospitals and various industrial plants. However, maintenance of the transfer switch has required that the involved circuit be disconnected from the existing source of power for safety purposes. This proved to be either too costly or impossible. Accordingly, a bypass-isolation switch is being added to the existing transfer switch to enable more frequent and safer maintenance of the transfer switch.

SUMMARY OF THE INVENTION

In accordance with this invention, there is provided an electric control system for switching between two current supply lines extending to a load, comprising an isolation switching structure, a transfer switching structure, and a bypass switching structure; the isolation switching structure including first and second control devices, the transfer switching structure including third and fourth control devices, the bypass switching structure including fifth, sixth, and seventh control devices, all of the control devices being operable between open and closed circuit conditions; one of the current supply lines including a first of two parallel paths extending to the load with one path including the first, third, and sixth control devices in series and with the other path including the fifth control device; the other of the current supply lines including a second of two parallel paths extending to the load with one path including the second, fourth, and sixth control devices in series and with the other path including the seventh control device, the bypass switching structure including interlock means between the fifth, sixth, and seventh control devices for preventing closing of one control device when another control device is closed, and interlock timing means comprising a cam and a cam-follower operatively connected to the fifth, sixth, and seventh control devices for opening and closing the circuit in those devices.

The advantage of the electric control system of this invention is that a closed circuit breaker must first be open before another breaker can be closed. Moreover, it provides for isolation of certain of the control devices for maintenance purposes.

BRIEF DESCRIPTION OF THE DRAWINGS

FIG. 1 is a front elevational view of a control cabinet;

FIG. 2 is a side elevational view thereof;

DESCRIPTION OF THE PREFERRED EMBODIMENT

Figure 3:
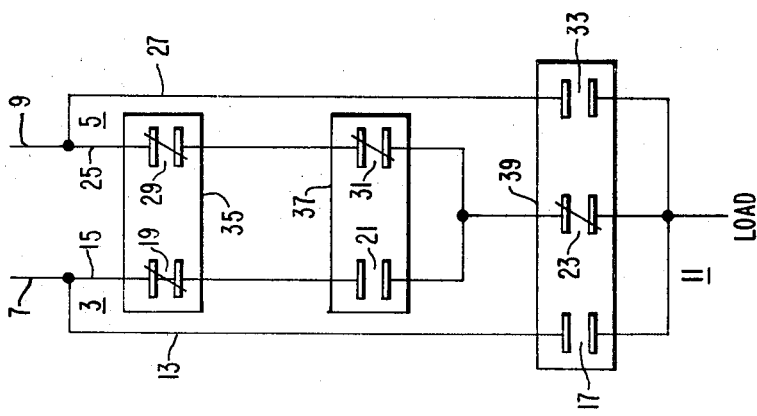
FIG. 3 is a circuit diagram of a switch structure having isolation and transfer switches with a bypass switch showing the switch structure in normal operating conditions.

In FIG. 3 a switch structure, generally indicated at 1, comprises two parallel paths or circuits 3 and 5. The circuit 3 extends from one current supply or emergency line 7 and the parallel path 5 extends from another current supply or normal line 9. Both paths lead to a load 11. The parallel path 3 comprises circuits 13 and 15, the former of which includes a control device or circuit breaker 17. The circuit 15 includes control devices or circuit breakers 19, 21, and 23.

The parallel path 5 comprises circuits 25, 27, the former of which includes control devices or circuit breakers 29, 31, and 23. The circuit 27 includes a control device or circuit breaker 33.

The switch structure 1 also includes an isolate switch 35, a transfer switch 37, and a bypass switch 39. The isolate switch includes the circuit breakers 19, 29, the transfer switch includes the circuit breakers 21, 31, and the bypass switch includes the circuit breakers 17, 23, 33. The circuit breakers 17, 19, 21, 31, 29, 23, 33 are a conventional type of circuit breaker, such as, for example, that shown in FIG. 6 and described hereinbelow.

The purpose of the transfer switch 37 is to automatically switch power from one or another of the current supplies 7, 9 in the event of the power failure in one of the current supply lines. The emergency power may be supplied from a generator (not shown). The isolate switch 35 and the bypass switch 39 permits maintenance to be performed safely on the transfer switch 37. The bypass switch 39 prevents the load 11 from being without power. Such redundant structure is becoming mandatory in hospitals and other critical facilities in the United States. Thus, the circuit breaker 23 is on 99% of the time. The other six circuit breakers enable functioning in a redundant mode possibly operating less than 1% of the time. The bypass switch 39 operates in a certain sequence or timing which prevents any two circuit breakers of the circuit breakers 17, 23, 33 from being on at the same one time. However, in the event that either of the bypass breakers 17, 33 trips and has welded contacts, such as, due to circuit overload, the handles of the circuit breakers 17, 23, 33 continue to operate.

Figure 4:
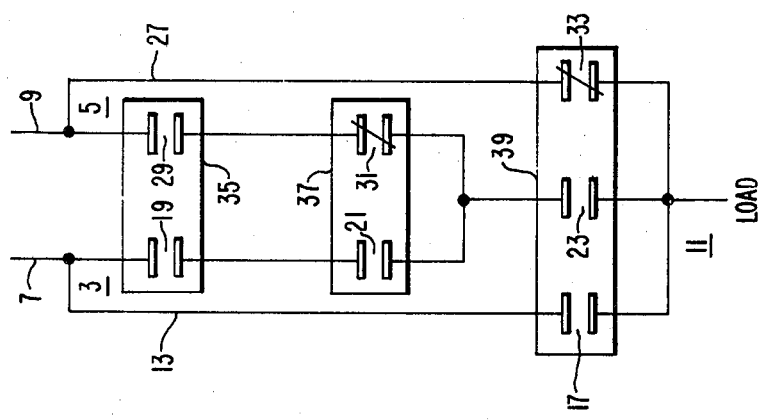
FIG. 4 is a circuit diagram similar to FIG. 3 showing the structure in a bypass normal condition.

The condition of the switch structure 1 (FIG. 3) shows the normal operating condition, whereby power is conducted from the normal line 9 through the circuit breakers 29, 31, 23 to the load 11. Where for some reason (FIG. 4) one of the circuit breakers, such as breakers 21 or 31 requires maintenance service, the circuit 27 including the circuit breaker 33 may be used, thereby circumventing the breakers 21 and 31. For that purpose isolate switch 35 including the breakers 19, 29 are opened to create safe working conditions at the circuit breakers 21, 31.

Figure 5:
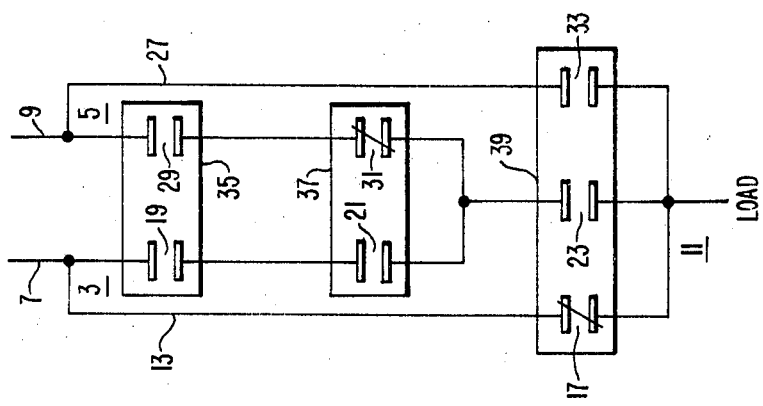
FIG. 5 is a circuit diagram similar to FIGS. 3 and 4 showing the switch structure in the bypass emergency condition.

As shown in FIG. 5, where the normal supply 9 is unavailable, the emergency supply 7 functions through the circuit 13 having the circuit breaker 17. In the alternative, emergency supply 7 moves through the circuit breakers 19, 21, 23. However, the bypass circuit 13 is shown in use to demonstrate that maintenance service may be performed at either or both the circuit breakers 21, 31 where necessary.

Figure 6:
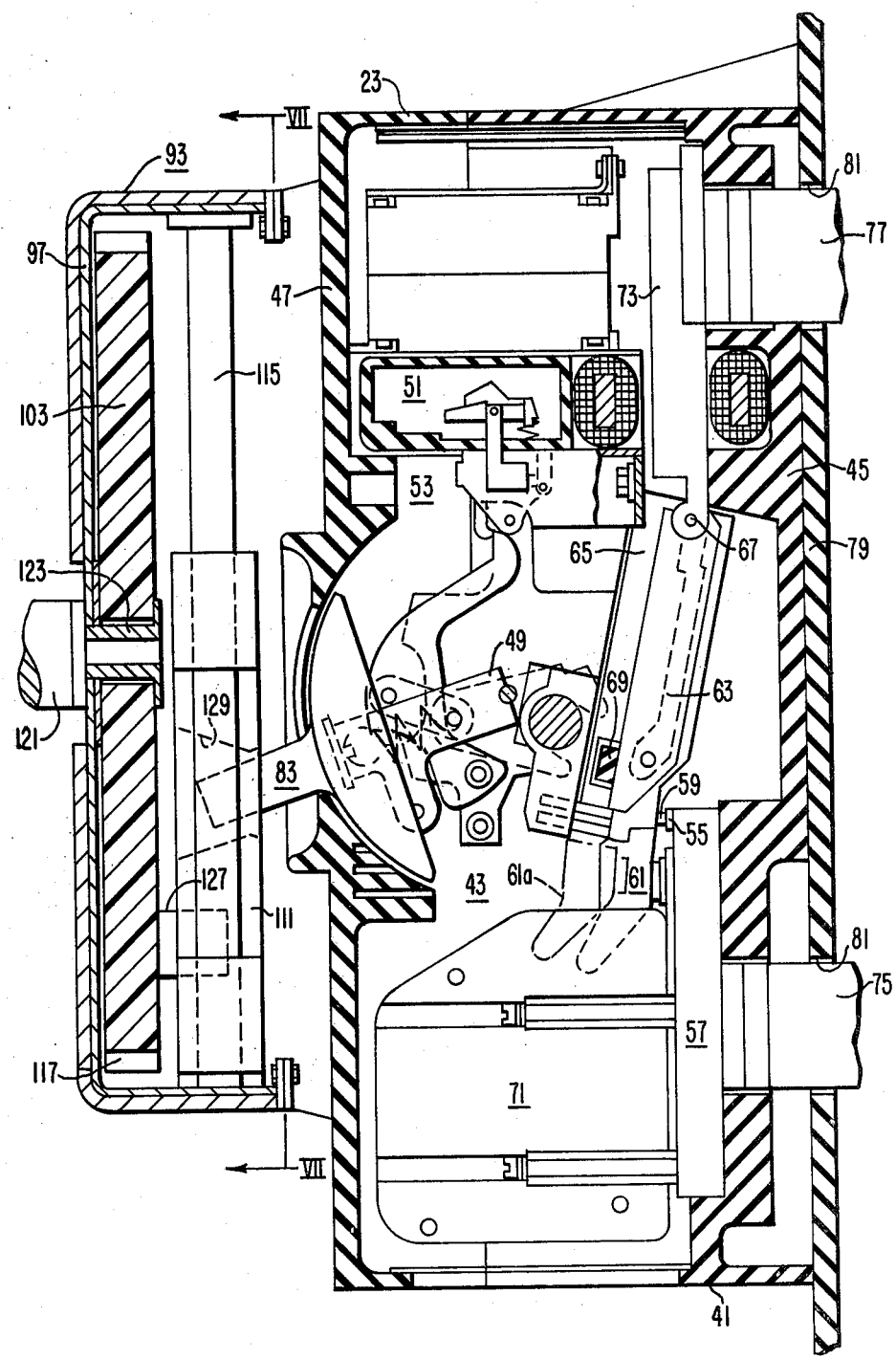
FIG. 6 is a sectional view, with parts broken away, of a circuit breaker operatively connected to an operating mechanism for moving the switch between open and closed conditions.

The several circuit breakers 17–33 are preferably constructed as shown, for example, by a circuit breaker 23 in FIG. 6. The circuit breaker 23 comprises an insulating housing 41 and a circuit breaker mechanism 43 supported within the housing. The housing 41 comprises an insulating base 45 and an insulating cover 47. The circuit breaker 23 is similar to that disclosed in U.S. Pat. No. 3,821,607 which is incorporated by reference as part hereof. Because of the full disclosure in that patent, the description of the operating parts is limited herein to the basic structure and operation. The circuit breaker mechanism 43 comprises an operating mechanism 49, a latch and trip device 51, and a trip actuator 53.

The circuit breaker 23 is a three-pole device comprising three compartments disposed in a side-by-side relationship. The center pole compartment is separated from the two outer pole compartments by insulating barrier means formed with a housing base 45 and the cover 47. The operating mechanism 49 is disposed in a center pole compartment and is a single operating mechanism for actuating the contents of all three pole units.

Each pole unit comprises a stationary contact 55 that is secured to a fixed main conductor 57. In each pole unit, a movable contact 59 is secured, such as by welding, to a contact arm 61 that is mounted on a switch arm 63. The assembly of the arms 61, 63 is pivotally supported at one end thereof on a support bracket 65 by a pivot pin 67. The switch arms 63 of all three pole units are connected to move in unison by a common insulating tie bar 69 that is rigidly connected to all three switch arms.

In each pole unit, an arc extinquishing unit or arc chute 71 is provided to extinguish the arcs drawn between the associated contacts 55, 59. When the contacts 55, 59 are closed, the circuit extends from the conductor 57 through the contacts 55, 59, the arm 61, and conductor 73. When the circuit breaker is open, the contact arm 61 is raised to the broken line position 61a. The conductors 75, 77, extending from associated bus bars (not shown), are electrically connected to the conductors 57, 73, respectively. The circuit breaker 23 is mounted on a panel 79 and the conductors 75, 77 extend through similar openings 81 therein. Finally, the operating mechanism 49 includes a handle 83 for moving the mechanism, either manually or otherwise, of the circuit breaker 23 between open and closed positions.

The assembly of the switches 35, 37, 39 is mounted in a cabinet 85 (FIGS. 1, 2) the interior of which is divided into three compartments by horizontal partitions 87, 89 which extend between front and rear walls of the cabinet. To save costs of materials, such as copper conductors, the bypass switch 39 is preferably disposed in the upper compartment and the transfer switch 37 is disposed in the lower compartment. An access door having a handle 91 which is preferably lockable, is provided on the lower compartment for the transfer switch 37.

Figure 8:
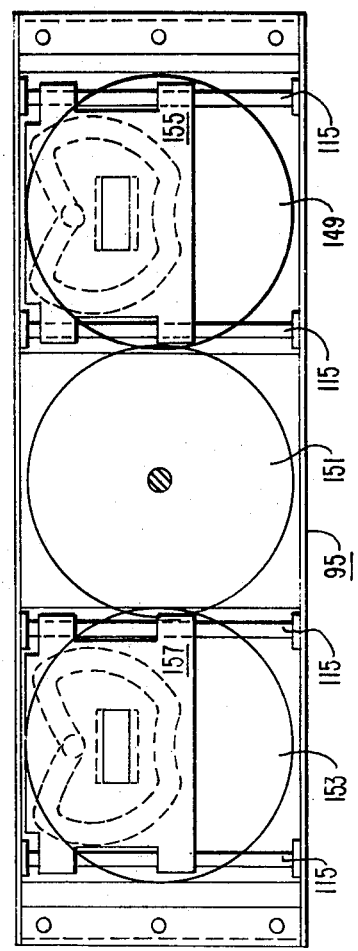
FIG. 8 is a view of another embodiment of the operating mechanism of FIG. 7.

In accordance with this invention one or more of the isolate, transfer, and bypass switches 35, 37, 39 are provided with interlock timing means for sequentially opening and closing the circuit breakers associated with each such switch to prevent simultaneous closing of more than one circuit breaker. As illustrated in FIGS. 1 and 2 the interlock means for the bypass switch 39 comprises a camming structure 93 and for the isolate switch 35 a camming structure 96 (FIG. 8). The circuit breakers 21, 31 for the transfer switch 37 are preferably operated by other means such as automatically.

Figure 7:
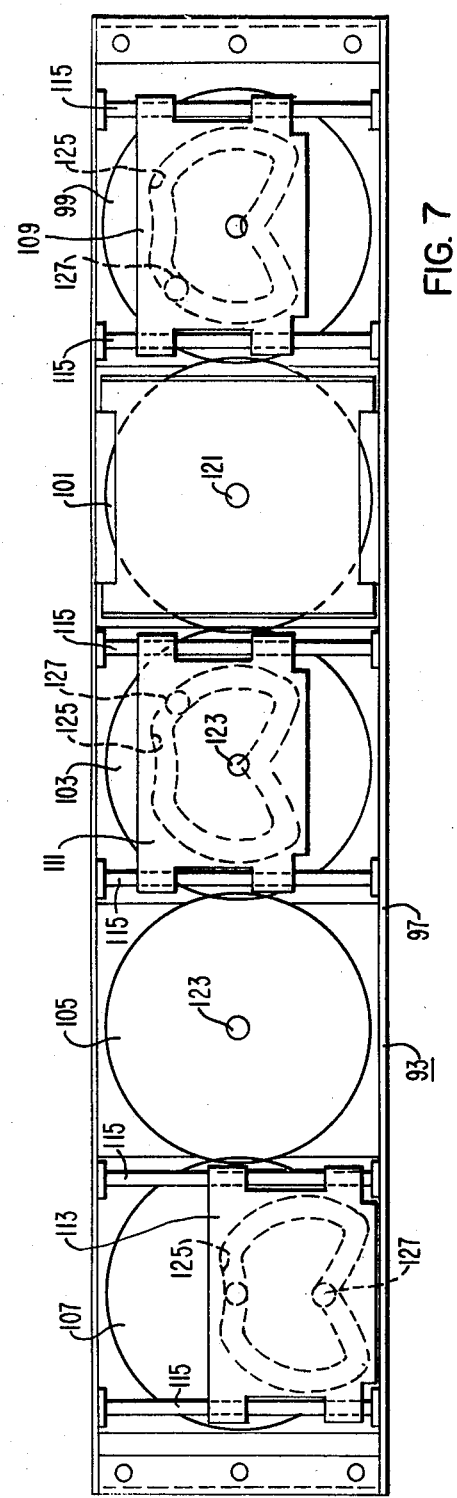
FIG. 7 is a sectional view of the operating mechanism taken on the line VII—VII of FIG. 6.
Figure 9:
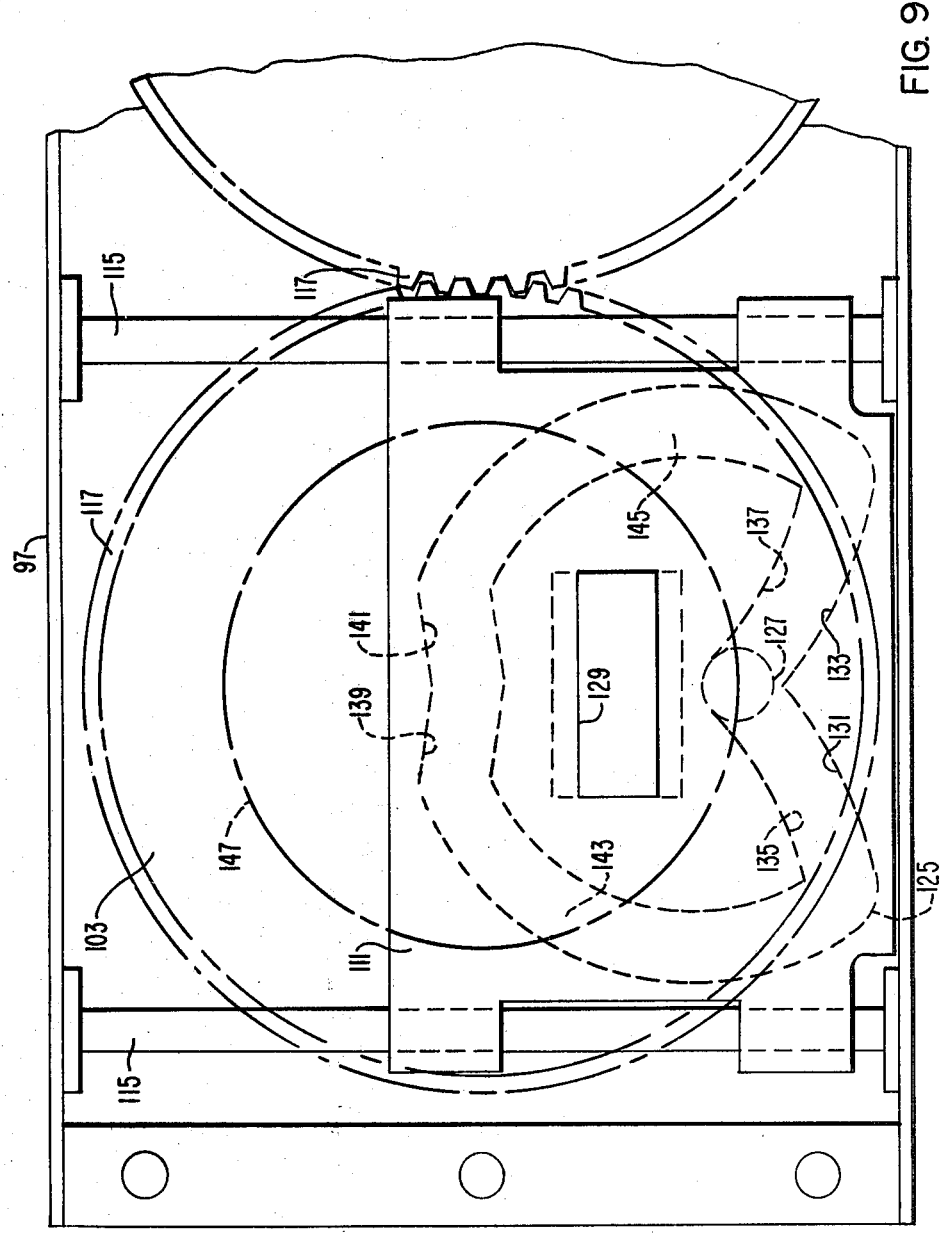
FIG. 9 is an enlarged fragmentary view of the operating mechanism showing the manner in which the several parts are interconnected.

As shown more particularly in FIGS. 6 and 7, the camming structure 93 comprises a frame 97, a plurality of gears 99, 101, 103, 105, and 107, and a plurality of cams 109, 111, 113. Moreover, a pair of similar cam guide rods 115 on which the cams are slideably mounted by camming action in response to rotation of the gears. Opposite ends of the cam guide rods 115 are secured at opposite ends to the frame 97. Each gear 99–107 includes the gear teeth 117 (FIGS. 6, 9) at the periphery thereof for driving engagement with adjacent gears. The gears 99–107 and the cams 109–113 are preferably molded members composed of an insulating material.

The gears are turned by a hand wheel 119 through a shaft 121 extending from the exterior of the cabinet 85 to the drive gear 101 (FIG. 7) and the remaining gears 99, 103–107 are pivotally mounted on mounting pins 123 and driven directly or indirectly by the gear 101.

The cams 109–113 comprise a cam track or groove 125 on the side thereof facing the corresponding gear. Each gear comprises a cam follower or pin 127 (FIGS. 6, 7, 9) which engage the corresponding cam track or groove 125 and thereby move the cams transversely upon the cam guide rods 115.

Different starting positions of the cam followers on the gears cause the cams to move transversely with respect to each other in a timing sequence.

The cams 109–113 function with corresponding circuit breakers, such as shown in FIG. 6, in which the handle 83 of the circuit breaker 23 extends into a handle receiving notch 129 in the cam 111 so that when the cam 113 is in the lower most position (FIG. 6), the handle 83 is in the position corresponding to the closed position of the contacts 55, 59. Conversely, as the cam 111 is moved upwardly on the cam guide rods 115, the handle 83 is moved, as a result of the follower 127 moving in the groove 125, to the off position to open the contacts 55, 59.

The embodiment of the cam track 125 (FIGS. 7, 8, 9) has a continuous configuration through which the cam follower 127 can move in a complete cycle upon one revolution of the hand wheel 119. The cam track 125 comprises (1) cam surfaces 131 and 133 for turning the circuit breaker 23 on, (2) cam surfaces 135, 137 for turning the circuit breaker off, as well as (3) cam surfaces 139, 141 for moving the handle 83 through the resetting operation period. The other portions 143, 145 are free travel (no load or no cam movement) areas of the cam track 125. Accordingly, as the gear 103 is rotated the cam follower 127 moves through a circular path 147. As it moves clockwise from the position of FIG. 9 it bears against the cam surface 135 to move the cam 111 upwardly and the handle 83 with it to the off position of the circuit breaker 23. With continued rotation of the pin 127, it enters the circular portion 143 with little or no movement of the handle 83 or cam, until the pin strikes the cam surface 139 to move the cam 111 upwardly slightly through the resetting operation. This operation is required for a tripped breaker. Subsequently, as the pin 127 continues to rotate it reaches the lower end of the cam portion 145 where it bears against the cam surface 133 and moves the cam 111 downwardly and the handle 83 with it to close the contacts 55, 59 (FIG. 6). Manifestly, rotation of the gear 103 in the reverse direction moves the pin 127 against corresponding surfaces, such as the surface 137 to open the contacts of the circuit breaker.

By arranging the other cams 109, 113 in different positions with respect to the corresponding pins 127, the other two circuit breakers are closed and opened in the opposite cycles with respect to the circuit breaker 23. Thus one of the circuit breakers 17, 23, 33 is closed when the other two are open. Before another breaker can be closed all breakers must be opened.

The camming structure 95 (FIG. 8) is used with the isolate switch 35 which involves two circuit breakers 19, 29 for which reason three gears 149, 151, 153 are provided with two cams 155, 157. Inasmuch as the circuit breakers 19, 29 are either open or closed simultaneously to isolate the circuits involved as set forth above, both cams 155, 157, having cam grooves similar to those described above, are movable up and down simultaneously to open and close the corresponding circuit breakers 19, 29. That operation is accomplished when a hand wheel 159 (FIGS. 1, 2) is rotated to turn a shaft 161 which turns the gear 151.

Figure 10:
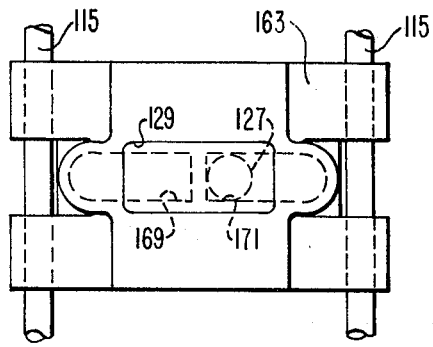
FIGS. 10, 11, and 12 are simplified views of other embodiments of the slide mechanism for moving the handle of the circuit breaker.
Figure 11:
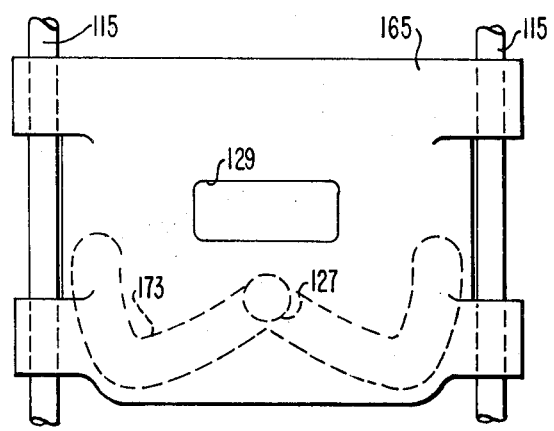
Figure 12:
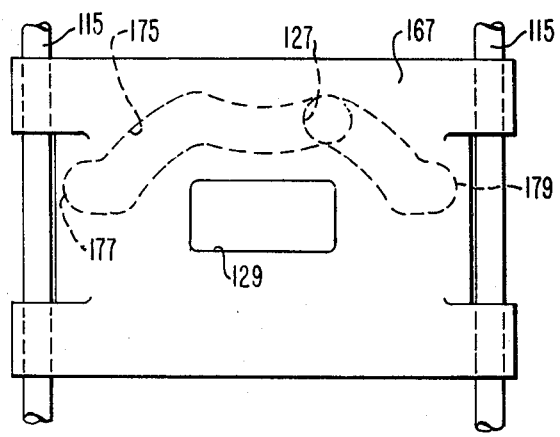

Other embodiments of the cams, such as cams 163, 165, 167, are shown in FIGS. 10, 11, 12, in which all other parts, such as the cam guide rods 115 have reference numbers similar to those of the above described cams. The cam 163 includes cam grooves 169, 171 in either of which the camming pin 127 is disposed. In this construction of the cam groove the hand wheel 159 is rotated through only a portion, such as about 90°, of an entire circle in order to open and close a circuit breaker. Manifestly, to reverse the condition of the circuit breaker, the hand wheel is rotated in the opposite direction through a similar short portion of the complete turn.

The cam 165 (FIG. 11) comprises a cam groove 173 in which the pin 127 is movable from its center position to either side of the groove upon rotation of a hand wheel through an arc of about 90° either clockwise or counterclockwise. The cam groove 173 includes portions of the cam groove 125 (FIG. 9) so that corresponding surfaces thereof operate to open and close the circuit breakers as set forth above with respect to the description of the cam in FIG. 9.

The cam 167 (FIG. 12) comprises a cam groove 175 in which the cam pin 127 is located. Here again the hand wheel 159 is rotated either clockwise or counterclockwise through only a portion of a complete rotation, whereby the pin 127 moves the groove 175 to either extremity depending upon rotation of the hand wheel. The "on" and "off" positions occur at the opposite ends 177 and 179 of the groove 175, which differ from the on-off positions of the cam 111.

The cams 165, 167 may be used in conjunction with any of the circuit breakers described above including those in the bypass switch 139; however, they are preferably used with the isolate switch 35.

In conclusion, the device of this invention provides for switching power from one power supply to another in the event of power failure in either. For example, where power from a utility supply is temporarily out of service an emergency supply from a generator can be provided. Moreover, the device provides for safe performance of maintenance on a transfer switch and enables continuous supply of power to the load.

What is claimed is:

1. An electric control system for switching between two current supply lines extending to a load, comprising an isolation switching structure, a transfer switching structure, and a bypass switching structure; the isolation switching structure including first and second control devices, the transfer switching structure including third and fourth control devices, the bypass switching structure including fifth, sixth, and seventh control devices, all of the control devices being operable between open and closed circuit conditions; one of the current supply lines including a first of two parallel paths extending to the load with one path including the first, third, and sixth control devices in series and with the other path including the fifth control device; the other of the current supply lines including a second of two parallel paths extending to the load with one path including the second, fourth, and sixth control devices in series and with the other path including the seventh control device, the bypass switching structure including interlock timing means between the fifth, sixth, and seventh control devices for preventing simultaneous closing of one control device when another of the control devices is closed.

2. The system of claim 1 in which the interlock timing means comprises a cam and a cam-follower structure operatively connected to the fifth, sixth, and seventh control devices for opening and closing the circuit in those devices.

3. The system of claim 2 in which each of the fifth, sixth, and seventh control devices comprises an operating mechanism for opening and closing circuits through the devices and the cam and the cam-follower structure being operatively connected to the operating mechanism.

4. The system of claim 3 in which the operating mechanism comprises a handle movable between open and closed circuit conditions, a slide member mounted on guides extending parallel to the direction of movement of the handle, the slide member having the cam including cam surfaces to effect movement of said member, the cam follower being movable against the cam surfaces to effect movement of the handle, and the slide member corresponding to each control device being preset to open or close a circuit as required.

5. The system of claim 4 in which the mechanism comprises a rotating member on which the cam follower is mounted, and means for rotating the rotating member.

6. The system of claim 5 in which the rotating member is a gear wheel of one control device is interconnected to gear wheels of adjacent control devices.

* * * * *